United States Patent
Scott

(10) Patent No.: US 6,986,484 B2
(45) Date of Patent: Jan. 17, 2006

(54) VTOL AIRCRAFT EXTERNAL LOAD DRAG REDUCTION SYSTEM

(75) Inventor: Mark Winfield Scott, Bethany, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 17 days.

(21) Appl. No.: 10/837,308

(22) Filed: Apr. 30, 2004

(65) Prior Publication Data

US 2005/0242237 A1  Nov. 3, 2005

(51) Int. Cl.
*B64C 1/20* (2006.01)

(52) U.S. Cl. .................. 244/118.1; 130/137.4
(58) Field of Classification Search ............ 244/2, 244/130, 17.11, 137.1, 137.4, 118.1, 118.3; 296/180.3, 180.5; 89/1.54
See application file for complete search history.

(56) References Cited

U.S. PATENT DOCUMENTS

| | | | | |
|---|---|---|---|---|
| 2,451,479 A | * | 10/1948 | Diehl | 244/130 |
| 2,470,120 A | * | 5/1949 | Walker | 89/1.54 |
| 2,585,030 A | * | 2/1952 | Nosker | 244/2 |
| 2,749,064 A | * | 6/1956 | Kuhlman, Jr. | 244/137.1 |
| 3,176,940 A | * | 4/1965 | Echeverria, Jr. | 244/118.1 |
| 3,450,376 A | * | 6/1969 | Semenovich et al. | 244/137.4 |
| 3,487,553 A | | 1/1970 | Stingl | |
| 3,544,047 A | * | 12/1970 | Gabriel | 244/17.11 |
| 3,966,144 A | | 6/1976 | Gabriel | |
| 4,054,103 A | | 10/1977 | Gabriel | |
| 5,538,316 A | * | 7/1996 | Bartholomew | 296/180.5 |
| 5,582,365 A | * | 12/1996 | Simmons | 244/130 |
| 6,039,385 A | * | 3/2000 | Husted | 296/180.3 |
| 6,098,925 A | * | 8/2000 | Burdsall et al. | 244/118.1 |
| 6,206,326 B1 | * | 3/2001 | Stanek et al. | 244/137.4 |

FOREIGN PATENT DOCUMENTS

| | | | | |
|---|---|---|---|---|
| GB | 559763 | * | 3/1944 | 244/118.1 |
| GB | 1441827 | * | 7/1976 | 244/118.1 |

* cited by examiner

*Primary Examiner*—Galen Barefoot
(74) *Attorney, Agent, or Firm*—Carlson, Gaskey & Olds

(57) ABSTRACT

A drag reduction system extends from an underside of a VTOL aircraft forward of a four-point sling system. The four-point sling system carries an external load close to an underside of the airframe and oriented along the aircraft longitudinal axis. The drag reduction system includes a retractable shield mounted beneath the underside of the aircraft which reduces drag of the external sling load and reduces the airloads on the external load.

26 Claims, 2 Drawing Sheets

VTOL AIRCRAFT EXTERNAL LOAD DRAG REDUCTION SYSTEM

BACKGROUND OF THE INVENTION

The present invention relates to a vertical takeoff and landing (VTOL) aircraft, and more particularly to a drag reduction system for an external load carried thereby.

Future military forces require enhanced vertical lift capabilities in a compact package. The CH-53E is currently the world's largest shipboard compatible helicopter. A significant consideration in the design of the CH-53E was shipboard compatibility. The CH-53E effectively defines the maximum aircraft spatial capacity, which will fit on the elevators and in the hangar deck of United States Marine Corps Amphibious Assault Ships, more commonly called an LHA or LHD. Emerging payload weight requirements are beyond the growth capabilities of the CH-53E while maintaining current shipboard compatibility requirements. Thus, a conventional helicopter like the CH-53E would be so large that it would not fit in the hangar deck or on the elevator of an LHA or LHD.

Super heavy lift (SHL) VTOL aircraft are generally defined as aircraft with twice the largest payload carried by current conventional helicopters. Future aircraft requirements are envisioned to be in the range of approximately 40,000 pounds of payload over a 600 mile range while being shipboard compatible.

VTOL aircraft are unique in their ability to carry loads externally. A dedicated external load configuration SHL VTOL aircraft has potential to meet the desired shipboard requirements. Disadvantageously, this configuration results in high aircraft drag due to the addition of the non-aerodynamic load beneath the aircraft. Vehicles, containers, fuel bladders, flat racks, and other loads can increase aircraft net drag anywhere from 50% to 100%. Furthermore many external loads cannot tolerate the air loads created at typical aircraft cruise speeds of around 150 kts. To avoid damage to windows, mirrors, doors, and numerous other features of vehicles and objects, external loads are often limited to around 100 kts. This further limits aircraft cruise speed and degrades range capability.

Fairings and other devices that are removably mounted to the external load are generally known. Disadvantages with this approach include the necessity of maintaining a relatively large inventory of fairings as each fairing is particularly tailored for a particular load. The fairings must also be attached and removed from the external load, which increases deployment times. Aerodynamic forces created by fairings may also be unfavorable to a slung load resulting in undesirable swinging. Attaching a device to a helicopter to fair around a slung load may also be impractical because the external loads are typically slung a relatively long distance from the aircraft underside.

Accordingly, it is desirable to provide an external load drag reduction system permanently installed on a VTOL aircraft, which permits higher cruise speeds, longer ranges, and reduced air loads on the external load.

SUMMARY OF THE INVENTION

The drag reduction system according to the present invention extends from an underside of a VTOL aircraft forward of a four-point sling system. The four-point sling system carries an external load close to or in contact with the underside of the airframe and oriented along the aircraft longitudinal axis. The drag reduction system reduces drag and air loads on the external load. The drag reduction system includes a retractable shield mounted to the aircraft such that attachment/detachment problems as well as inventory issues are avoided.

The present invention therefore provides a drag reduction and airloads reduction system for VTOL aircraft externally slung loads which permits higher cruise speeds and longer ranges.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
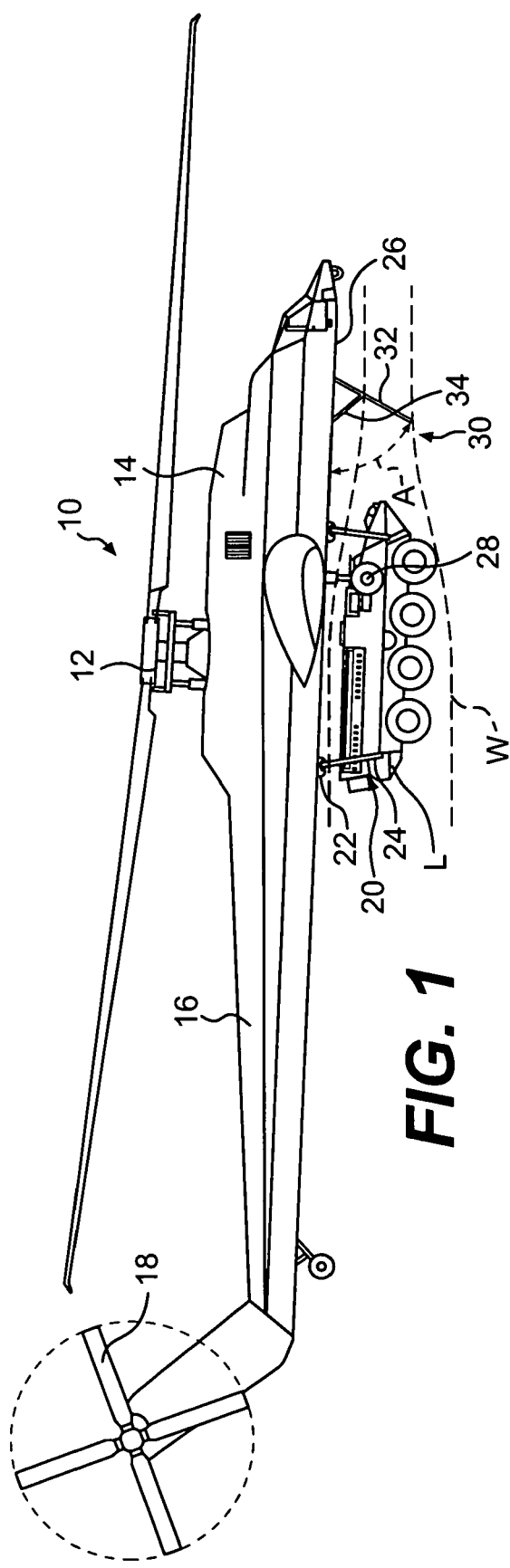
FIG. 1 is a general side view of a drag reduction system mounted to an exemplary VTOL aircraft embodiment for use with the present invention.

FIG. 1 schematically illustrates a VTOL aircraft 10 having a main rotor assembly 12. The aircraft 10 includes an airframe 14 having an extending tail 16 which mounts an anti-torque rotor 18. Although a particular flying crane type helicopter configuration, which does not include a cabin section, is illustrated in the disclosed embodiment, other VTOL machines such as tandem rotor, coaxial rotor, tilt-rotor and tilt-wing aircraft will also benefit from the present invention.

Figure 4:
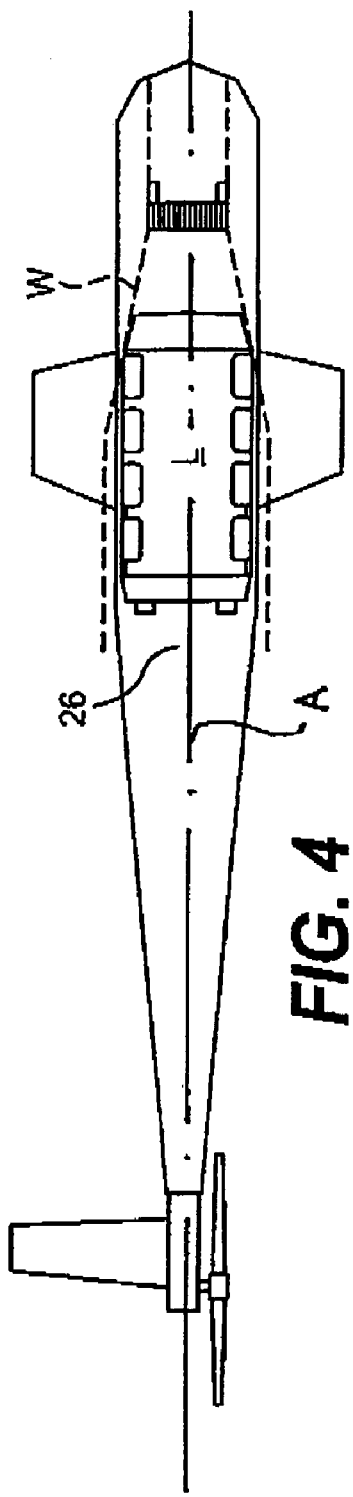
FIG. 4 is a general bottom view of a drag reduction system mounted to an exemplary VTOL aircraft embodiment for use with the present invention.

An external load L is attached to the airframe 14 through a four-point sling system 20. The sling system 20 includes four hoists 22 which deploy a cable 24 to each corner of the external load L for attachment thereof. It should be understood that various sling actuation and mounting arrangements will also benefit from the present invention. The cables 24 are connected to the load L in a conventional manner. The four-point sling system 20 preferably retracts the external load L to be carried close to or in contact with the underside 26 of the airframe 14 and preferably maintains the external load L between the aircraft landing gear 28. In addition, due to the four-points of engagement, the four-point sling system 20 permits the external load L to be oriented and maintained along the longitudinal axis A (FIG. 4) of the airframe 14 even under relatively radical aircraft maneuver.

Figure 2:
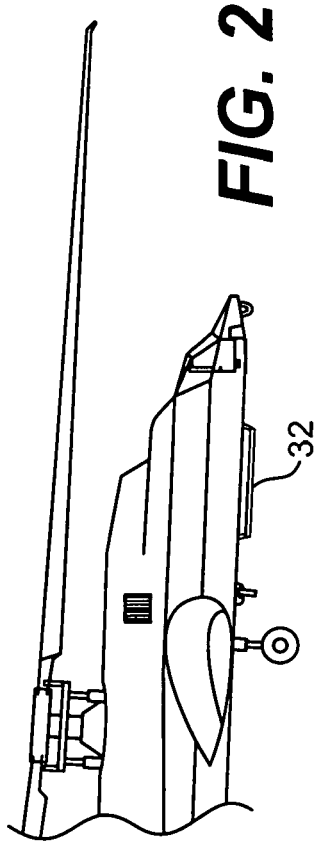
FIG. 2 is an expanded side view of an aerodynamic shield in retracted position.
Figure 3:
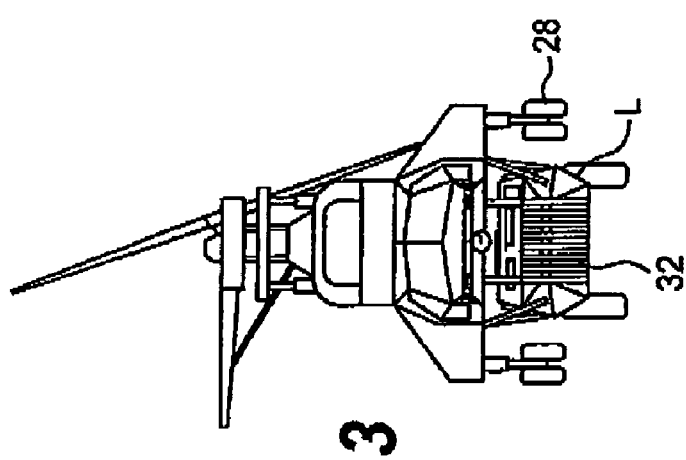
FIG. 3 is a general front view of a drag reduction system mounted to an exemplary VTOL aircraft embodiment for use with the present invention.

A drag reduction system 30 extends from the underside 26 of the airframe 14 forward of the sling system 20. The drag reduction system 30 includes an aerodynamic shield 32 and actuator 34 to selectively retract and deploy the shield 32 (FIG. 2). The shield 32 is preferably a generally planar member formed as a solid, lattice, ladder and/or porous structure, which is centered on the external load L (FIG. 3). That is, the shield 32 need not be a solid member to function. As the external load L is carried close to the underside 26 of the airframe 14, the shield 32 need only extend or be deployable a relatively short distance from the underside 26.

The shield 32 creates an aerodynamic interference phenomena, which reduces the net drag of two objects when the objects are positioned relative to each other. The shield 32 becomes the forward object and creates a wake W (also illustrated in FIG. 4) of reduced velocity, which is preferably centered on the external load L. The reduced velocity defined within the wake boundary lines W reduces drag on the external load L. Also, the external load L alters the flow field behind the shield 32 and lowers the net drag generated by the two objects. The aerodynamic phenomena is understood by those skilled in the art. An example of a practical use is the drafting effect used by a pair of race cars where the two in close longitudinal alignment can travel faster for the same power as either can independently.

The shield 32 is selectively deployed such as by extending to a predetermined arcuate distance A such that the net drag of the shield 32 and the external load L is less than the external load L alone. Notably, the shield 32 need not be of a greater frontal area than the external load L to achieve this effect as the shield 32 is located forward of the external load L and the external load L is located close to the underside 26 from which the shield 32 extends. The exact shape, position, movement, and orientation of the shield relative the load L are within the capabilities of one of ordinary skill in the art who has the benefit of this disclosure.

Applicant has determined that an approximate 20% reduction in aircraft net external load drag and a 50% reduction in airloads on the external load can be obtained for a shield 32 sized at approximately 50% of the drag of an external load L. These savings translate into approximately a 5% higher speed for the same aircraft power and a 25% higher speed for the same aerodynamic loads on the external load.

Moreover, as the external load L is located close to the underside 26 and the shield 32 extends from the underside 26, airflow that would otherwise pass between the external load slung in a conventional manner and the underside 26 is minimized. The elimination of this airflow reduces the interference drag between the airframe 14 and the external load L by an appreciable amount, which further increases aircraft speed.

Although the shield 32 is illustrated as a single member which articulates through an are A, it should be understood that the drag reduction system 30 may alternatively move in a different manner and may be oriented, shaped, sized and/or moved in response to the shape and drag level of the external load L. The drag reduction system 30 may additionally be adjusted relative aircraft attitude and/or velocity to maintain the wake W centered on the external load L.

The drag reduction system 30 provides a reduction in drag on the external load L and a reduction in air loads on the external load L. Higher cruise speeds and longer ranges are thereby achievable. The system 30 is retractable and stays with the aircraft such that attachment/detachment and inventory issues are eliminated.

It should be understood that relative positional terms such as "forward," "aft," "upper," "lower," "above," "below," and the like are with reference to the normal operational attitude of the vehicle and should not be considered otherwise limiting.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A drag reduction system for carrying an external load close to an underside of a VTOL aircraft defining a longitudinal axis generally parallel to an airflow generated in forward flight comprising:
    a sling system; and
    a shield forward of said sling system, said shield transverse to the longitudinal axis to increase a wake of reduced velocity airflow around a volume defined adjacent to the sling system and below the underside of the VTOL aircraft.

2. The drag reduction system as recited in claim 1, wherein said shield is porous.

3. The drag reduction system as recited in claim 1, wherein said shield comprises a lattice structure.

4. The drag reduction system as recited in claim 1, wherein said shield defines a frontal area smaller than the external load.

5. The drag reduction system as recited in claim 1, wherein said shield is retractable.

6. The drag reduction system as recited in claim 1, wherein said shield pivots through an arc relative the VTOL aircraft underside.

7. The drag reduction system as recited in claim 1, wherein said four-point sling system and said shield are mounted to a generally flat planar underside of the VTOL aircraft.

8. The drag reduction system as recited in claim 1, wherein said sling system comprises a four-point system.

9. The drag reduction system as recited in claim 1, wherein said sling system includes a multitude of points which orient the external load substantially along the VTOL aircraft longitudinal axis.

10. The drag reduction system as recited in claim 1, wherein said sling system includes a multitude of hoists, each of said multitude of hoists operable to deploy a cable for attachment to the external load.

11. A VTOL aircraft comprising:
    a sling system; and
    a drag reduction system forward of said sling system, said drag reduction system comprising a shield movable relative an underside of the VTOL aircraft such that said drag reduction system is transverse to a VTOL aircraft longitudinal axis to increase a wake of reduced velocity airflow around a volume defined adjacent to the sling system and below the underside of the VTOL aircraft.

12. The VTOL aircraft as recited in claim 11, wherein said shield is porous.

13. The VTOL aircraft as recited in claim 11, wherein said shield defines a frontal areas smaller than an external load.

14. The VTOL aircraft as recited in claim 11, wherein said drag reduction system articulates in response to aircraft airspeed.

15. The VTOL aircraft as recited in claim 11, wherein said drag reduction system articulates in response to aircraft attitude.

16. The VTOL aircraft as recited in claim 11, wherein said four-point sling system and said shield are mounted to a generally flat planar underside of the VTOL aircraft.

17. The VTOL aircraft as recited in claim 11, wherein said sling system comprises a four-point sling system.

18. The VTOL aircraft as recited in claim 11, wherein said sling system includes a multitude of points which orient the external load substantially along the VTOL aircraft longitudinal axis.

19. The VTOL aircraft as recited in claim 11, wherein said sling system includes a multitude of hoists, each of said multitude of hoists operable to deploy a cable for attachment to the external load.

20. A method of reducing drag on an external load carried by a VTOL aircraft comprising the steps of:

(1) carrying the external load adjacent an underside of the VTOL aircraft with a sling system such that the external load is oriented along the VTOL aircraft longitudinal axis; and (2) deploying a shield from the underside of the VTOL aircraft and transverse to the VTOL aircraft longitudinal axis to increase a wake of reduced velocity airflow around a volume defined adjacent to the sling system and below the underside of the VTOL aircraft such that a net drag of the shield and the external load is less than the drag of the external load alone.

21. A method as recited in claim 20, wherein said step (2) further comprises the step of:

deploying the shield from the underside of the VTOL aircraft.

22. A method as recited in claim 20, wherein said step (2) further comprises the step of:

deploying the shield from the underside of the VTOL aircraft such that the shield defines a frontal area less than a frontal area defined by the external load.

23. A method as recited in claim 20, wherein said step (2) further comprises the step of:

deploying the shield from the underside of the VTOL aircraft to deflect airflow which would otherwise pass between the external load and the underside of the VTOL aircraft.

24. A method as recited in claim 20, wherein said step (1) further comprises the step of:

attaching the external load through four points.

25. A method as recited in claim 20, wherein said step (1) further comprises attaching the external load through a multitude of points.

26. A method as recited in claim 20, wherein said step (1) further comprises the steps of:

(a) deploying a cable from each of a multitude of hoists;

(b) attaching each cable of said step (a) to the external load; and (c) retracting each cable to retract the external load such that the external load is oriented adjacent the underside of the VTOL aircraft.

\* \* \* \* \*